US008976239B2

(12) United States Patent
Wei et al.

(10) Patent No.: US 8,976,239 B2
(45) Date of Patent: Mar. 10, 2015

(54) SYSTEM AND APPARATUS FOR COLOR CORRECTION IN TRANSMISSION-MICROSCOPE SLIDES

(75) Inventors: Hong Wei, Lawrenceville, NJ (US); Michael H. Brill, Kingston, NJ (US)

(73) Assignee: Datacolor Holding AG, Luzern (CH)

( * ) Notice: Subject to any disclaimer, the term of this patent is extended or adjusted under 35 U.S.C. 154(b) by 393 days.

(21) Appl. No.: 13/594,107

(22) Filed: Aug. 24, 2012

(65) Prior Publication Data

US 2014/0055592 A1 Feb. 27, 2014

(51) Int. Cl.
*H04N 7/18* (2006.01)
(52) U.S. Cl.
USPC ............................................. 348/79; 348/80
(58) Field of Classification Search
CPC .... G02B 21/34; G02B 21/365; G02B 21/367; G02B 21/002; G02B 21/24; G02B 21/02; G02B 21/08; H04N 7/17; H04N 17/00; H04N 17/02; H04N 17/002; G01N 21/6458; H01J 37/28; H01J 37/224; G06T 7/0018
USPC .............. 348/79, 80, 180, 187; 359/368, 369, 359/391, 385, 396; 382/167
IPC ................................... H04N 7/18, 17/00, 17/02
See application file for complete search history.

(56) References Cited

U.S. PATENT DOCUMENTS

| 2005/0237550 | A1 | 10/2005 | Hu | |
|---|---|---|---|---|
| 2009/0185034 | A1* | 7/2009 | Kishida et al. | 348/79 |
| 2012/0269417 | A1 | 10/2012 | Bautista et al. | |
| 2013/0044200 | A1* | 2/2013 | Brill et al. | 348/79 |

OTHER PUBLICATIONS

Murakami, Yuri et al., "Color Correction in Whole Slide Digital Pathology," 20$^{th}$ Color and Imaging Conference Final Program and Proceedings, Society for Imaging Science and Technology, 2012, pp. 253-258.

* cited by examiner

*Primary Examiner* — Sherrie Hsia
(74) *Attorney, Agent, or Firm* — Leason Ellis LLP.

(57) ABSTRACT

The present invention concerns a system and method for calibration and adjustment of the pixel color values represented within a digital image of a sample by a transmission microscope. Furthermore the present invention is directed to providing sufficient color information in order to generate a color mapping matrix that allows for the creation of a synthetic image to depict the sample under a desired illumination. The system and method provides a solution that generates a destination-device independent image that is configurable to any calibrated display device.

22 Claims, 4 Drawing Sheets

SYSTEM AND APPARATUS FOR COLOR CORRECTION IN TRANSMISSION-MICROSCOPE SLIDES

FIELD OF THE INVENTION

The present invention is directed to a system and method for color correcting images of samples placed on a transmission-microscope slide. More particularly, the present invention is directed to a system and method that uses a microscope slide with an integrated color filter array to assist in obtaining the proper color values necessary to generate a synthetic image of a sample. Through the present invention, color values of a sample under one illumination condition are accurately converted in order to generate a new image having the correct color values of the same sample under the same or a different illuminant.

BACKGROUND OF THE INVENTION

Currently, digital imaging has allowed for unprecedented levels of collaboration between technicians, researchers, and scientists. In part, this collaboration is due to the relatively inexpensive nature of current digital imaging technology. Image capture devices and associated software platforms combined with improved computer screens and monitors have also allowed for the rapid analysis and review of images where accurate color fidelity is essential. The proliferation of different styles, models and technical complexity of digital imaging technology can be readily seen in the digital microscopy market. In the field of digital imaging, there are many microscope systems that provide custom digital images. Unfortunately, there is no system or method currently available that ensures color accuracy and consistency from one system to another.

Additionally, recording images of hard to detail specimens requires diligence. A fortuitous imaging of a sample might not be replicable under subsequent conditions. However, once the image is recorded, modifying it in imagine editing suites can alter the desired appearance. Therefore, what is needed is the ability to calibrate an image of a sample so as to render the sample in different lighting conditions. In order to accurately modify the RGB values of a digital image, various data points regarding illumination and transmittance spectra need to be known beforehand. Thus, what is needed is a system and apparatus that incorporates the various illuminant data into a synthetic device-independent image which is modifiable given a desired illuminant type.

Co-owned U.S. patent application Ser. No. 13/211,875 titled "System and Apparatus for the Calibration and Management of Color in Microscope Slides" filed on Aug. 17, 2011, herein incorporated by reference in its entirety, describes the use of color calibrated slides to determine the color values of biological samples under various lighting conditions. However the system described in the '875 Application does not describe embodiments particular to a transmission-microscope system.

What is needed is a system and method that simplifies and standardizes the calibration of a slide with an integrated color filter array. In particular, the integrated color filter array is easiest to manufacture when the filters are interference filters, whereupon measures must be taken to compensate for the angle-dependence of the spectrum of light transmitted through an interference filter. What is also needed is a system and method for calculating CIE tristimulus values within the array using real or idealized spectral power distributions, known transmission spectra and CIE color matching functions. What is also needed is a system and method for measuring real spectral power distribution of the microscope light through the optical train of the microscope itself, and integrating such a measurement into the color-management system. What is also needed is a system that produces images of microscope slides that have been transformed so that the color values present the anticipated color values of the sample under a specified lighting condition. The subject invention is addressed to these deficiencies in the art.

SUMMARY OF THE INVENTION

In accordance with a broad aspect of the present invention, a system and method disclosed herein provide for the calibration and analysis of images taken of a sample and its associated microscope slide. In more particular aspects, the present invention provides for the analysis of images taken of a microscope slide with an integrated color filter array. In part, the present invention enables the capture, modification and distribution of images that have been color value modified so as to represent images of the sample under various desired lighting conditions and microscope settings. The filter-array transmission spectra are used to color-manage the image, but such spectra are usefully known only if they are conditioned on numerical-aperture settings for the microscope, so numerical-aperture-conditioned calibration is ah aspect of the invention. The system and method described provide at least a microscope slide with an integrated color filter array, a microscope with known or controllable numerical aperture, an imaging device configured to output the RGB camera values to a processor system, and a processor system that is capable of generating linear or non-linear mapping of RGB to C.I.E. tristimulus XYZ values. Furthermore, the present system and method include the use of an optional spectrophotometer or colorimeter in order to generate spectral power distribution (SPD) of the real microscope illuminant for use in the color calibration system.

Additionally, the present method is directed to a series of steps for using a system generally as described. These steps include determining a spatial-uniformity calibration value by using a blank field image and a step for selecting the desired destination illumination. The method also includes calculating the CIE tristimulus values of the plurality of color elements of the slide array by using real or ideal illuminant spectral power distribution, known color filter transmission spectra values, and the 2° CIE color matching functions. A further step is provided for mapping the RGB pixel values of the color filter array to C.I.E. tristimulus values through a color mapping matrix. An additional step includes generating device-independent CIE tristimulus values for each pixel of the sample image through the application of the color mapping matrix. The method also provides a step for outputting the CIE tristimulus image to a calibrated output device.

DESCRIPTION OF ILLUSTRATIVE CERTAIN EMBODIMENTS OF THE INVENTION

By way of overview and introduction, the present invention concerns a system and method for calibration and adjustment of the pixel color values represented within a digital image of a sample. Furthermore, the present invention is directed to providing sufficient color information in order to generate a color mapping matrix that allows for the creation of a synthetic image depicting the sample under a desired illuminate. The system and method provides a solution to scientists and other technical professionals which enables them to obtain a sample under a given lighting condition and generate a synthetic image that represents the accurate color pixel values of that sample under the actual microscope light or a different lighting scheme.

Figure 1:
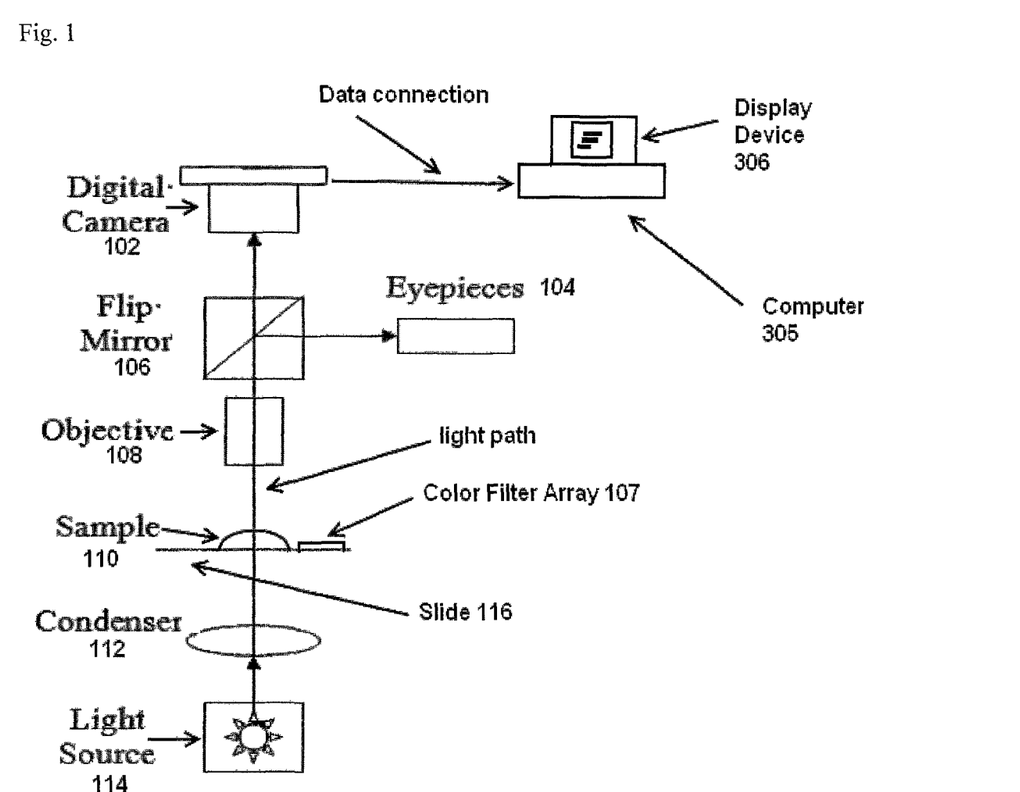
FIG. 1 is an illustrative diagram of the microscope system described herein.

As seen in FIG. 1, the principles behind the present invention are applicable to, and can be used in conjunction with, multiple types of microscopes. For example, the illustrated arrangement employs the use of a transmission microscope. However, those skilled in the art will recognize that the principles behind the present system can be used with different microscope types, such as reflectance or fluorescent microscopes.

A transmission microscope is a device or apparatus in which the light source and the viewer are on opposite sides of the plane of the slide/specimen, and in which transmitted light is passed through the specimen. The light is transmitted to an image recording device designed to record images of a sample. When using a transmission microscope, those images are the product of the incident illumination of the light source and the transmittance spectrum of the specimen. FIG. 1 illustrates an imaging device 102 configured to record images of a slide 116 in a transmission microscope. The light directed from the light source 114 is conditioned by the condenser 112 and illuminates the sample 110 on the slide 116. The objective 108 collects the light (shown as a light path arrow) passing through the sample 110 and delivers that light to either the eyepiece 104 or imaging device 102, through a flip mirror 106. The imaging device 102 is configured to output the images to a processor, such as a computer 305. The computer 305 is optionally equipped with an output device 306, such as a calibrated monitor.

In the illustrated arrangement, the imaging device 102 is a CCD (Charged Coupled Detector) or CMOS (Complementary metal-oxide-semiconductor), having sufficient components to record images to a temporary or permanent storage device. In a specific arrangement, the CCD sensor of the imaging device 102 is a ⅓" frame pixel recording device. Furthermore, the imaging device is configured to record images having at least three (3) independent color channels (tri-chromatic characteristics).

The imaging device 102 is also configured to transmit recorded images to the computer 305 for analysis or processing. Those skilled in the art will appreciate that the data connection between the imaging device 102 and the computer 305 is any standard wired or wireless connection. For example, the imaging device 102 and the computer 305 of FIG. 1 are connected via a data cable. However, in an alternative arrangement of elements, the data connection is supplied by a local area network (LAN) or short range wireless network using protocols such as Wi-Fi, Bluetooth, or RFID.

The imaging device 102 is any device capable of capturing the required spectral data in sufficient detail necessary for the calibration functions to proceed. For example, a digital still camera, digital motion picture camera, portable computer camera, desktop computer camera, PDA with equipped camera, imaging device equipped smart-phone, camera phone, web camera, and so on, having sufficient resolution for capturing color information, are suitable imaging devices. Likewise, any device may be used as an imaging device so long as it is capable of capturing optical data through a lens or plurality of lenses, and transmitting an image file that includes the captured data. As one non-limiting example, a digital single lens reflex camera and microscope adaptor is a suitable image capture device.

In the given arrangement, the light source 114 is an incandescent light source, such as a halogen-based light source. In an alternative arrangement, the light source 114 is formed of multiple elements, each capable of providing a steady source of specific spectrum illumination, such as ultraviolet, infrared, daylight (CIE standard D65), tungsten light, fluorescent light, or other specific visible light frequencies. Further, the light source 114 is positioned such that the reference illuminations emitted by the light sources 114 are incident upon the microscope stage and the slide 116 itself. In an alternative embodiment, these light sources are actively filtered so as to produce specific illumination characteristics.

Those skilled in the art will appreciate that other light sources, so long as their spectral power distributions (SPD) cover the visible wavelength range, are suitable for use in the described system.

Figure 2A:
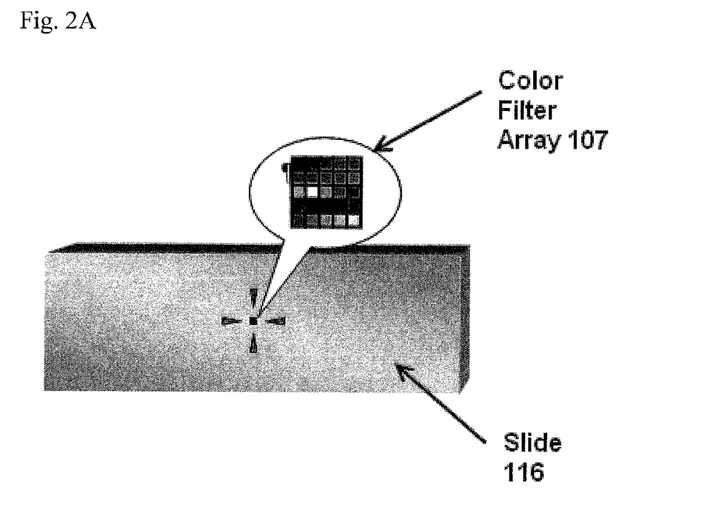
FIG. 2A is an illustrative diagram of a microscope slide and integrated color filter array in accordance with one arrangement of the system.
Figure 2B:
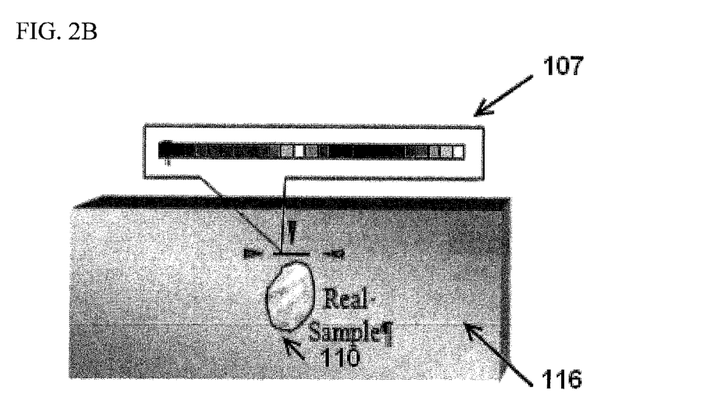
FIG. 2B is an alternative illustrative diagram of a microscope slide as described by one aspect of the device described in FIG. 2A.
Figure 2C:
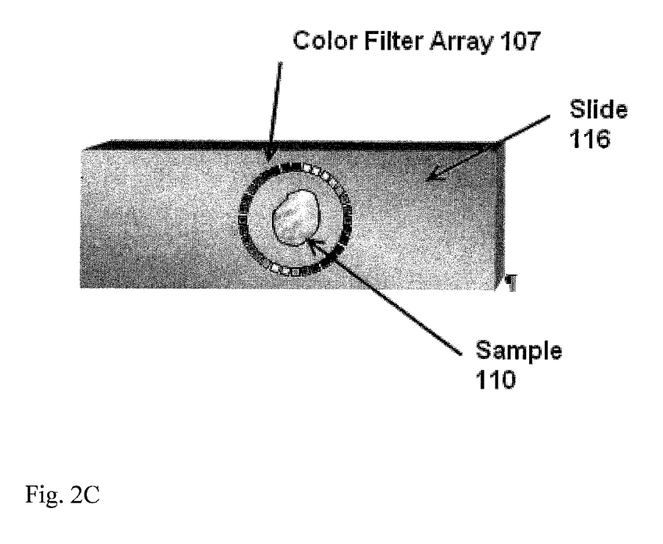
FIG. 2C is another illustrative diagram of a microscope slide as described by one aspect of the device described in FIG. 2A.

FIGS. 2A-C, illustrates a specimen slide 116 (slide substrate) containing a composite color filter array 107 of known transmittance colors. This color filter array 107 is positioned so that it is available to be directly illuminated. The color filter array 107 is further configured so that images taken of the sample 110 also include at least a portion of the color filter array 107. In FIG. 2A, the color filter array 107 is a grid. However, those skilled in the art will appreciate that other specific geometries of the color calibration arrays are envisioned.

In a further arrangement, the color filter array 107 contains a plurality of sections with different transmission spectra necessary to replicate the complete range of transmission spectra likely to appear in the slide image. In the preferred embodiment, at least one portion of the array contains achromatic (black, white and grey) elements.

The color filter array 107 is affixed to the slide through standard production techniques. For example, the color calibration array 107 is printed onto the slide substrate by photolithographic printing or other similar techniques. In FIG. 2A, the color filter array 107 contains a plurality of color elements with different transmission spectra that, when combined, provide a complete coverage of the visible spectrum. While the color filter array 107 is depicted within the center of the slide 116, it is possible to position the color array at any position on the slide substrate that is visible to an imaging device 102.

In the described system, the specific transmission characteristics (such as transmission percentage at each wavelength for a variety of settings of the microscope numerical aperture) of each element of the color filter array 107 is known and stored within a database accessible by the computer 305. The slide substrate 116 is formed of standard optical slide materials that are commercially available for the given purpose. The slide substrate 116 is composed of any suitable material for inclusion with the given microscope type. For example, the slide substrate 116 is composed of glass, plastics, composite materials, and other standard transparent materials used for transmission microscopy slide production. The slide 116 can be formed of material suitable for photolithography. Such photolithography based slides are composed of materials that are commonly used in the art for photolithography techniques. Alternatively, one can also fuse (using optical glue) the color elements on a regular microscope slide.

To minimize the impact from the global fluctuations of the light source 114, all of the elements of the color filter array 107 are captured in a single image. Because test specimens most often fill the microscope's field of view even at low magnification, the color filter array will most likely have to reside on a different area on the same slide, or on a slide that is different from the test specimen. Although calibration accuracy would be greater if the color filter array were on the same slide as the test specimen, having a color filter array on each test-specimen slide would be cost-prohibitive. Accordingly, in a preferred embodiment, the described system uses at least two slides for color calibration. The first slide contains a specified integrated color array 107, while the second slide contains the sample under investigation. Due to magnification constraints, the color array 107 and the portion of the sample under investigation may not be resolvable in the same image. For example, FIG. 2A illustrates a preferred embodiment of the slide substrate within integrated color array 107 that is not configured with a sample. Likewise, FIG. 2B illustrates a slide substrate with a sample under analysis.

In an alternative arrangement, the imaging device 102 is configured to record an image of the slide 116 that captures both the sample 110 and the color filter array 107. The slide 116 is optionally configured to incorporate enhancements capable of providing information to an end user. For example, the slide 116 incorporates visual source identifiers, such as serial numbers, bar codes, q-codes, or other visual identifiers.

As shown in FIG. 2A, the slide is equipped with a 5×5 filter array equipped with both narrow band-pass filters and neutral density filters. Those skilled in the art will appreciate that any combination of filters that are suitable for the given illumination source 114 (e.g. incandescent, UV etc.) is envisioned. In the given arrangement, a slide 116 not affixed with a sample 110 is used as a calibration slide for in order to determine the proper values for use in color correction.

FIG. 2B provides a slide 116 equipped with both a sample 110 and a color filter array 107. In this configuration, the color filter array 107 is positioned such that an image of both the sample 110 and the color filter array 107 are within the field of view of the imaging device 102. In an alternative arrangement, the color filter array 107 is positioned such that a small movement of the slide 116 will move the color filter array 107 or the sample 110 into the field of view of the imaging device 102. In a primary configuration the array 107 is integrated into the slide substrate. In a further configuration, the array is configured such that it is shielded from abrasions in transport, such as through an optionally protective coating. In an alternate configuration, the color filter array 107 is integrated into a slide cover (not shown) which is mated with the slide substrate to secure the sample.

As shown, a biological sample 110 is placed on the substrate slide 116 and is illuminated. As seen in the field of view, the color calibration target 107 is visible within the same frame as the biological sample 110. This ensures that the correct calibration processes are preformed on the colors located within the sample. In the present system, knowledge of the calibrated values found within the color filter array 107 allows for the determination of the correct chromatic values for the biological sample 110.

FIG. 2C illustrates a differing arrangement of the color filter array 107, in which the sample is surrounded by individual filter elements. Regardless of the arrangement, the color filter array 107 is always of such dimensions that each individual element is viewable under a given magnification. In one arrangement, each filter element is at most as $10 \times 10$ $\mu m^2$. As such, the entire array in FIG. 2A is about $50 \times 50$ $\mu m^2$. This allows a microscope under $100 \times$ objective magnification to resolve each individual filter element. Those skilled in the art will appreciate that various different dimensions of filter elements are combinable so long as the total size of the array does not render it incapable of being recorded on the desired magnification as a single image.

Figure 3A:
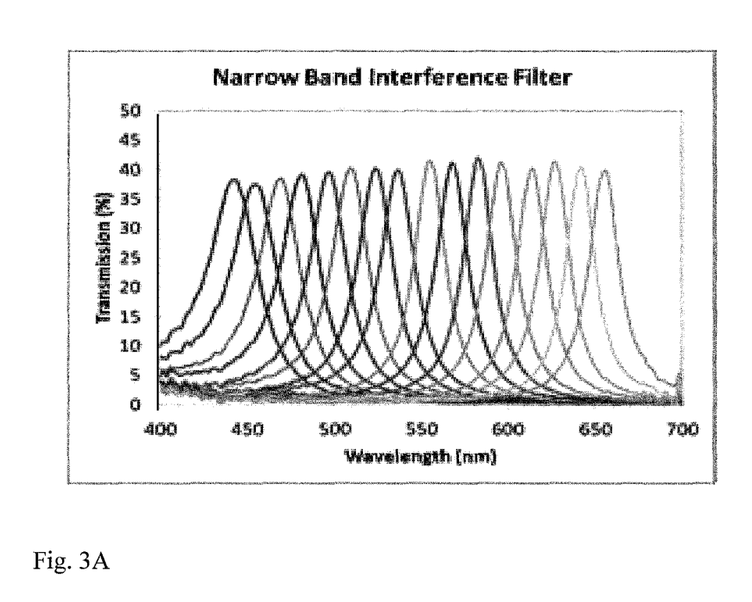
FIG. 3A is an example of the interference filter spectra of the microscope slide.
Figure 3B:
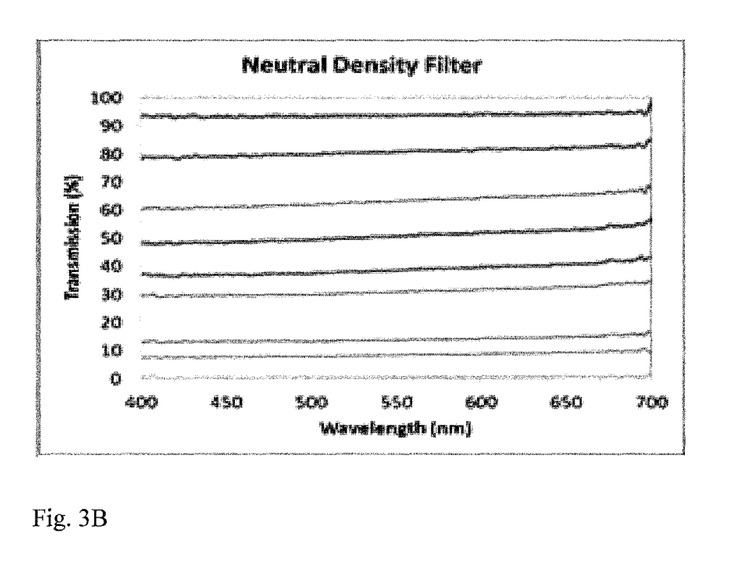
FIG. 3B is an example of the neutral density filter spectra of the microscope slide.

Each of the arrays depicted in FIGS. 2A-C provides a plurality of narrow-band color filters with peak wavelengths covering the visible spectrum (e.g., ranging from 400 to 700 nm) and neutral density filters with optical density (OD) from 0.04 to 2.0. As shown in FIGS. 3A-B, the transmission spectrum of each filter is pre-measured using a spectrophotometer that is temporarily mounted at the same position as the imaging device 102. The measurement of the transmission spectra is accomplished using industry standard techniques and instruments. Once the values of the elements of the array are known, they are stored in a database or look up table for future reference.

Those skilled in the art will appreciate that the light spectra transmitted by the filter elements comprising the color filter array 107 may be sensitive to viewing and illumination angle. Thus, the light transmission values of the color filter array 107 change as the numerical aperture (N.A.) of the microscope system is altered. To compensate for this change, the transmission spectra of the filter elements are recorded at several N.A., settings. These values are also stored within a database for future reference during the color calibration processing. If the test N.A. setting is one of the recorded values, the transmission spectra for that N.A. value are used. If not, the transmission spectra may be adopted as either the spectra for the closest tabulated N.A., or obtained through interpolation.

The illustrated system also provides a processor 305 configured to generate the tristimulus values from the pixels of the images without human intervention. The processing duties and functions of the computer are, in one arrangement, performed by a local microprocessor configured to execute instructions stored in a storage medium. The local computer or processor 305 is further configured to possess a database in which reference data values are stored and accessed.

In an alternative arrangement, the computer 305 is part of a remote processing appliance accessible via a network. This reduces the need for complex computational hardware on site. Furthermore, this allows for specific calibration and maintenance issues to be performed on a centrally located computer and software system and ensures that there is less variance between users.

It is further expected that the computer 305 is fully capable of connecting to external and internal networks so as to distribute processing tasks or exchange data related to each slide. The computer 305 is configured to connect to networks and databases using commonly understood programming interfaces and interface modules, e.g., Media Server Pro, Java, Mysql, Apache, Ruby on Rails, and other similar application programming interfaces and database management solutions. The illustrated computer system 305 is characterized, in part, by its broad adaptability to user configurations, multiple user inputs, and hardware configurations.

The computer 305 is configured to allow selection of a series of color correction options. For example, the computer 305 is configured to select one of a series of pre-defined destination illuminants for the resulting synthetic image. These destination illuminants (SPD vector), in part, configure the color values of the sample in the resulting synthetic image. For example, the destination illuminant selected is configured such that the resulting synthetic image matches the view of the sample as seen through the eyepiece of a microscope. In one example, the computer 305 provides access to a database which stores various pre-determined SPD vectors. Each stored SPD vector corresponds to a particular known lighting condition.

In the event that the light source 114 SPD vector (corresponding to the destination illuminant) is not stored in the database, that SPD must be pre-measured by a spectroradiometer such as is made by Konica-Minolta CS-1000a, coupled to the eye piece 104 of the microscope and configured to output the SPD vector for use in the present system.

The processor is configured to generate a CIE tristimulus vector of each filter element incorporating the real or ideal illuminant spectral power distribution values, known color filter transmission spectra values, and the 2° CIE color matching functions into a 3-by-K matrix, where K is the number of filter elements and the dimension 3 represents the X, Y, Z tristimulus coordinates. The given numerical aperture (N.A.) setting of the microscope determines which of the stored transmission spectra of each filter element is used.

The computer 305 is further configured to accept images of the slide that incorporate pixels corresponding to the color filter array 107 and the pixels corresponding to the sample 110. The computer 305 is further configured to generate a matrix of all the RGB pixel values from each filter k, such that the RGB vector is $$D_k = \begin{pmatrix} R \\ G \\ B \end{pmatrix}_k,$$

where k is the number of color filters. The 3-by-K R, G, B matrix (D) corresponds to the pixel color values of the filter array. This matrix is mapped to C.I.E. tristimulus value matrix ($\overline{X}$) through the use of a 3 by 3 color mapping matrix (M) using the equation $\overline{X}=MD$. Following the least-square approximation, M is estimated as $M=\overline{X}pinv(D)=\overline{X}D'(DD')^{-1}$.

The database 306 is configured to store this color mapping matrix (M) for use with any subsequent test sample under the same illuminant with the same microscope settings.

Upon recording a raw image of the actual sample under study, the computer 305 transforms the raw image to generate device-independent C.I.E. tristimulus values of each pixel on the image such that the pixels are transformed according to the following the equation of $$\begin{pmatrix} X \\ Y \\ Z \end{pmatrix}_{i,j} = M \begin{pmatrix} R \\ G \\ B \end{pmatrix}_{i,j},$$

where i and j are the pixel coordinate of the real sample image.

The computer 305 is configured to output these corrected images as either a device independent C.I.E. value image, or as an image of device-dependent RGB values for use with a color calibrated output device such as a monitor. For example, a calibrated monitor is configured with a display profile that determines the proper display of RGB color values. The device independent C.I.E. value image is converted by sending the values through the proper display profile. Once converted through the display profile, the RGB values are properly configured for accurate display on the display device. Furthermore, a user is able to retrieve these images for further analysis or distribution.

The present invention also incorporates a sequence of steps for using the system so described to carry out and achieve the function of providing a color calibrated image to a display or storing the color calibrated image for later retrieval. Such a method involves, but is not limited to an instrument selection step, in which the settings, such as N.A., light source intensity, light source CCT, objective, and camera white balance and exposure time/gain, are set to the desired levels before the color correction procedure.

The method includes a calibrating step in which a spatial uniformity calculation is performed on a blank microscope field. A calculating step is provided in order to determine the CIE tristimulus values of the plurality of color filters comprising the color filter array using a real or ideal illuminant spectral power distribution, the known transmission spectra, and the 2° CIE color matching functions. An image recording step is also provided, in which an image of the color filter array is recorded and sent to a processor for processing. The method also provides for an extracting step in which the computer extracts the corresponding camera-RGB pixel values of each color filter to a matrix and maps that matrix to the CIE tristimulus value matrix of the color filters. A transformation step is provided in which the computer extracts the corresponding camera-RGB pixel values for the entire sample image and converts those values into corresponding device independent C.I.E. tristimulus values using the color mapping matrix.

The method also includes a step for generating device dependent RGB images for delivery to a calibrated monitor or printer. The present method also provides an optimization step for increased accuracy through the use of extended size matrices. In a further arrangement, the present method also includes an optional step of determining the spectral power distribution of the current illuminant through the use of a spectrophotometer or colorimeter.

Each of the steps described are performed and executed as a series of modules operating on a computer. Each of these modules can comprise hardware, code executing in a processor, or both, that configures a machine such as the computing system 305 to implement the functionality described herein. The functionality of these modules can be combined or further separated, as understood by persons of ordinary skill in the art, in analogous implementations of embodiments of the invention.

The calibration module is further configured to include a series of sub modules for recording the microscope and digital imager settings, including the numerical aperture values, and image settings. Furthermore, a sub-module is provided for recording an image of a blank microscope field and storing the resulting pixels intensities as $I_o(i,j,b)$. In this module, i, j denote the spatial position of a pixel and b denotes the spectral band within the digital imaging device. A normalizing sub-module is provided for dividing any subsequent image pixels $I_n(i,j,b)$ by the respective blank-field values $I_0(i,j,b)$ to generate a normalized pixel value for use in the color calibration or in color rendering modules.

The color selection step includes a sub-module for allowing a user to select a specific destination illumination of the resulting synthetic image. The destination illumination spectrum is determined according to the illumination spectrum desired for the synthetic image. The user may select a predefined illuminant to render the image, in which case the software retrieves one of the SPD vectors (S) for known or common illuminants that have been pre-stored in the database accessible by the computer. Alternatively, the user may activate a sub-module configured to record the light-spectrum values from a spectroradiometer positioned in place of the eyepiece.

The calculating step includes a sub-module for obtaining the CIE tristimulus values of the color filters. In one particular instance, the instruction set uses specific algorithms to calculate the CIE-value vector $$\left( \overline{X_k} = \begin{pmatrix} X \\ Y \\ Z \end{pmatrix}_k \right)$$

of each color filter by the following equations:

$$X_k = k_0 \sum_{360\,nm}^{780\,nm} T_{NA}(\lambda, k) S(\lambda) \overline{x}(\lambda) \Delta\lambda \quad \text{(formula 1.0)}$$

$$Y_k = k_0 \sum_{360\,nm}^{780\,nm} T_{NA}(\lambda, k) S(\lambda) \overline{y}(\lambda) \Delta\lambda \quad \text{(formula 1.1)}$$

$$Z_k = k_0 \sum_{360\,nm}^{780\,nm} T_{NA}(\lambda, k) S(\lambda) \overline{z}(\lambda) \Delta\lambda \quad \text{(formula 1.2)}$$

with $$k_0 = 100 \Big/ \sum_{360\,nm}^{780\,nm} S(\lambda) \overline{y}(\lambda) \Delta\lambda \quad \text{(formula 1.3)}$$

Where $T_{NA}(\lambda, k)$ is the transmission spectrum of the color filter at a specific numerical aperture (NA). The $T_{NA}(\lambda, k)$ of each color filter is calibrated prior the color correction and saved in a storage, such as a database connected to the computer 305. $S(\lambda)$ is the spectral power distribution (SPD) of the either a standard illuminant, such as D65, A, and F11, or the actual SPD of the microscope light source.

In the above formulas, $x(\lambda), y(\lambda), z(\lambda)$ are 2° CIE color matching functions. The C.I.E. tristimulus values of all the color filters are combined into a 3 by K matrix (X), where K is the number of color filters and 3 refers to the X, Y, Z values.

The calculating module also includes a sub-module for generating a matrix from the RGB pixel values of the color filter array such that a 3 by K matrix (D), where the $k^{th}$ column of D $$\left( D_k = \begin{pmatrix} R \\ G \\ B \end{pmatrix}_k \right)$$

represents the spatial average of the pixels from filter color k. An additional sub-module is provided to map the D matrix to C.I.E. tristimulus values ($\overline{X}$) matrix through a 3 by 3 color mapping matrix (M) using the equation $\overline{X}=MD$. Following the least-square approximation, M is estimated as $M = \overline{X}\text{pinv}(D) = \overline{X}D'(DD')^{-1}$.

The optimization module also includes a sub-module for extending the linear 3 by 3 matrix to larger matrices in order to yield improved accuracy. In one example, the vectors $D_k$ is extended from $[R\ G\ M]_k'$ to $[R\ G\ B\ R^2\ G^2\ B^2\ RG\ RB\ GB]_k'$. As a result, the matrix D is extended from 3 by K to 9 by K, and the color mapping matrix (M) is extended from 3 by 3 to 3 by 9. This provides better color accuracy at the cost of less tolerance to the nonlinearity of the camera response. In the alternative, the sub module is equipped to extend the linear 3 by 3 matrix into larger matrices by extending vector $D_k$ from $[R\ G\ B]_k'$ to $[R\ G\ B\ (RG)^{1/2}\ (BG)^{1/2}\ (RB)^{1/2} \ldots]_k'$. An additional sub-module is directed to transforming the RGB values on each pixel of the sample image so as to match anticipated color values under the destination illuminant. For example, the transformation sub-module is configured to transform the pixels according to the following the equation $$\begin{pmatrix} X \\ Y \\ Z \end{pmatrix}_{i,j} = M \begin{pmatrix} R \\ G \\ B \end{pmatrix}_{i,j},$$

where i and j are the pixel coordinate of the sample image. A further sub-module is provided to store the resulting XYZ C.I.E. tristimulus values in a database. Thus, the color calibration matrix M, derived from the tristimulus values of the array, is used to transform the RGB values of the image pixels of the test image to generate an device independent image.

A display module is provided that processes the XYZ values through a display profile, thus creating a device-dependent image of display-RGB inputs to drive a calibrated display device, such as a monitor.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

What is claimed is:

1. A system for correcting the color of transmission microscope images for different illuminants, comprising:
   a sample;
   a microscope having:
      a configurable numerical aperture having a plurality of pre-set positions,
      an optical train having a distal end and a proximal end and configured to convey illumination,
      an illumination source configured to direct illumination into the distal end of the optical train, and
      a selectable end piece positioned at the proximal end of the optical train, wherein the end piece is configured to direct the illumination to one of an image recording device or a removable light spectrum sensing device;
   a microscope slide having:
      an integral transmission filter array of known color spectra for each position of the numerical aperture and selectively disposed between the illumination source and the optical train;
   an image recording device, configured to record a plurality of images of the slide and the integral color filter array, wherein a raw image is comprised of a pixel array, each pixel having a color value;
   an image processor, configured by code executing therein, to:
      select a destination illumination;
      calculate the tristimulus values of the color filter array;

obtain the raw image from the image recording device of the slide sample and color filter array;

extract the RGB pixel values of the color filter array from the raw image;

create a mapping matrix of the RGB pixel values to the tristimulus values;

generate tristimulus values of a composite image by applying the mapping matrix to the RGB pixel values of the raw image;

whereby the color of the microscope images is corrected without user intervention.

2. A system for correcting the color of microscope images as in claim 1, wherein the configurable numerical aperture is set to a specific value.

3. A system for correcting the color of microscope images as in claim 2, wherein the configurable end piece is configured to direct light to the light spectrum sensing device.

4. A system for correcting the color of microscope images as in claim 3, wherein the microscope slide is not disposed between the illumination source and the optical train.

5. A system for correcting the color of microscope images as in claim 4, wherein the light spectrum sensing device is configured to output a spectral power distribution value corresponding to the illumination source and transmit the power distribution value to the image processor.

6. A system for correcting the color of microscope images as in claim 1, wherein the tristimulus values of the color filter array is calculated from the known transmission spectra determined by the numerical aperture position, the spectral power distribution of the destination illuminant and two-degree CIE color matching functions.

7. A system for correcting the color microscope images as in claim 1, wherein the image processor is connected to an output device configured to display the composite image.

8. A system for correcting the color of microscope images as in claim 1, wherein the output device is a visual display device.

9. A system for correcting the color of microscope images as in claim 1, wherein the microscope slide is composed of a slide substrate and a slide cover, and a plurality of color filters are integral to the slide substrate or slide cover.

10. A computer-implemented method for utilizing a particular connection with an electronic device combining a microscope, at least one microscope slide with an integral color filter array; a secured sample for analysis affixed to at least one slide, a digital imaging device and an imaging processor equipped with a memory storage device configured to execute code for transforming the color values of pixels of an image recorded by the imaging comprising:

obtaining the numerical aperture value of the microscope;

obtaining the stored spectra data based on the specific numerical aperture obtained;

selecting a desired color-correction mode from a list of available color correction modes;

obtaining an image that includes at least the pixels of the color filter array;

obtaining RGB values of the pixels corresponding to the color filter array;

deriving a color calibration matrix M of CIE tristimulus vector data from the elements of the array;

obtaining a test image that includes at least the RGB pixels corresponding to the test sample;

transforming the RUB pixels of the test image to CIE tristimulus values using color calibration matrix M;

outputting a transformed CIE tristimulus image to an output device without user intervention.

11. The method for managing the color on microscope images of claim 10 wherein:

the sample and integral array are included on a single microscope slide.

12. The method for managing the color on microscope images of claim 10 wherein:

the sample and integral array are on a separate microscope slides.

13. The method for managing the color on microscope images of claim 10 wherein:

the transformation step further comprises a step for deriving an RGB matrix of values on each pixel of the test image and corresponding the RGB matrix to the color calibration matrix.

14. The method for managing the color on microscope images of claim 10 comprising:

a further step of performing a special uniformity calibration using a blank microscope field prior to recording a first image.

15. The method for managing the color on microscope images of claim 10 comprising:

a further step of obtaining a spectral power distribution values of the illuminant without a slide present to reconstruct the colors of test samples under that same illuminant.

16. The method for managing the color on microscope images of claim 10 wherein:

the tristimulus values of the color filter array is calculated from the known transmission spectra determined by the numerical aperture position, the spectral power distribution of the destination illuminant and two-degree CIE color matching functions.

17. The method for managing the color on microscope images of claim 14 wherein:

the spectral power distribution used to generate the tristimulus values are different than the spectral power distribution of the illumination source of the microscope.

18. The method for managing the color on microscope images of claim 13, wherein:

the spectral power distribution of the illumination source is obtained with a light measuring device.

19. The method for managing the color on microscope images of claim 10, wherein the color correction includes further step of:

optimizing the tristimulus estimation value by generating non-linear combinations of the reference colors used to generate the mapping matrix.

20. The method for managing the color on microscope images of claim 10, wherein the color correction includes further step of:

converting the tristimulus image output through the use of a RGB device dependent profile; and generating a RGB corrected image.

21. The method for managing the color on microscope images of claim 10, wherein the:

array image and the test image are selections taken from a single image.

22. The method for managing the color on microscope images of claim 10, wherein the:

array image and the test image are selections taken from different images.

* * * * *